(12) United States Patent
Zimmermann et al.

(10) Patent No.: US 12,182,301 B2
(45) Date of Patent: Dec. 31, 2024

(54) SYSTEM AND METHOD FOR PROCESSING A DATA SUBJECT RIGHTS REQUEST USING BIOMETRIC DATA MATCHING

(71) Applicant: Robert Bosch GmbH, Stuttgart (DE)

(72) Inventors: Christian Zimmermann, Stuttgart (DE); Sven Trieflinger, Renningen (DE); Fatma Betül Durak, Pittsburgh, PA (US); Stefan Gehrer, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 276 days.

(21) Appl. No.: 17/518,142

(22) Filed: Nov. 3, 2021

(65) Prior Publication Data

US 2023/0133033 A1    May 4, 2023

(51) Int. Cl.
| | | |
|---|---|---|
| *G06F 21/62* | (2013.01) | |
| *G06F 16/23* | (2019.01) | |
| *G06F 16/245* | (2019.01) | |
| *G06F 21/33* | (2013.01) | |
| *G06N 5/022* | (2023.01) | |
| *H04L 9/32* | (2006.01) | |

(52) U.S. Cl.
CPC ...... *G06F 21/6245* (2013.01); *G06F 16/2379* (2019.01); *G06F 16/245* (2019.01); *G06F 21/335* (2013.01); *G06N 5/022* (2013.01); *H04L 9/3231* (2013.01); *G06F 2221/2141* (2013.01)

(58) Field of Classification Search
CPC .... G06F 16/2379; G06F 16/245; G06F 21/32; G06F 21/335; G06F 21/604; G06F 21/6245; G06F 2221/2141; G06N 20/00; G06N 3/08; G06N 5/022; H04L 9/3231
See application file for complete search history.

(56) References Cited

U.S. PATENT DOCUMENTS

| | | |
|---|---|---|
| 10,169,608 B2 | 1/2019 | Van Dyne et al. |
| 10,223,508 B2 | 3/2019 | Berger et al. |
| 10,438,020 B2 | 10/2019 | Barday et al. |
| 10,824,758 B2 | 11/2020 | Hankeln et al. |
| 10,878,127 B2 | 12/2020 | Brannon et al. |
| 2017/0104597 A1* | 4/2017 | Negi ............... H04L 9/0825 |
| 2020/0204545 A1* | 6/2020 | Pacella ............. G06V 40/172 |
| 2020/0285770 A1* | 9/2020 | Brannon ........... G06F 21/6245 |
| 2021/0073412 A1* | 3/2021 | Kvochko ............ G06T 1/0021 |

(Continued)

*Primary Examiner* — Theodore C Parsons
(74) *Attorney, Agent, or Firm* — Maginot, Moore & Beck LLP

(57) ABSTRACT

A system and method are disclosed for processing data subject rights requests. The system and method advantageously enable data controllers to train machine learning models on unaltered data having PII, while maintaining the privacy of the unaltered data and enabling compliance with data subject rights requests with respect to the data. The system and method incorporate a biometric database that stores biometric data extracted from the unaltered data having PII. In order to identify data relating to a data subject rights request, biometric data is received from the data subject and is matched against the biometric data stored in the biometric database. Based on the matched biometric data, the original unaltered source data having PII can be identified for the purpose of exercising one or more data subject rights, such as erasure, access, and objection to processing.

18 Claims, 2 Drawing Sheets

(56) References Cited

U.S. PATENT DOCUMENTS

| | | | |
|---|---|---|---|
| 2021/0141931 A1 | 5/2021 | Brannon et al. | |
| 2021/0398676 A1* | 12/2021 | Evans | G06N 3/08 |
| 2022/0100831 A1* | 3/2022 | Moreno | H04L 63/102 |
| 2022/0210132 A1* | 6/2022 | Tanaka | H04L 63/1408 |
| 2022/0342967 A1* | 10/2022 | Battle | G06V 40/171 |
| 2023/0080686 A1* | 3/2023 | Gupta | G06F 16/3347 |
| | | | 726/26 |

* cited by examiner

SYSTEM AND METHOD FOR PROCESSING A DATA SUBJECT RIGHTS REQUEST USING BIOMETRIC DATA MATCHING

FIELD

The device and method disclosed in this document relates to data subject rights and, more particularly, to processing a data subject rights request using biometric matching.

BACKGROUND

Unless otherwise indicated herein, the materials described in this section are not admitted to be the prior art by inclusion in this section.

Under data protection and data privacy regulations such as the European Union's General Data Protection Regulation (GDPR), data subjects (i.e., people) have various rights with respect to their personal data. These data subject rights include, for example, a right of access, a right of erasure, and a right to object to processing. The right of access gives data subjects the right to access their personal data and information about how this personal data is being processed. The right to erasure provides gives data subjects the right to request erasure of personal data related to them on any one of a number of grounds. Finally, the right to object to processing gives data subjects the right to object to processing personal data for marketing or non-service related purposes. To these ends, data controllers and data processors have various duties including responding to data subject rights requests from data subjects that seek to exercise one of the aforementioned data subject rights.

In automated driving, video footage containing personal information is often processed by vehicles, such as by an object detection system of the vehicle. This video footage is also sent to a remote server backend and further utilized to train machine learning models for the purpose of improving the algorithms used in automated driving, such as those of the object detection system. However, pedestrians caught in the video footage captured by the vehicle cannot consent to the processing by the vehicle. Moreover, in practice, these pedestrians are also hardly able to exercise their rights to object to the further processing of this personal information at the remote server backend to train machine learning models, or to exercise their rights to access and erasure.

These issues can pose compliance problems for Original Equipment Manufacturers (OEMs) and suppliers using video footage containing personal information for training machine learning models. However, simply removing the personal information from the data is not a feasible solution. Particularly, any alteration to the data jeopardizes the safety of the vehicle operations that utilize the machine learning models because training machine learning models works best with unaltered data. For example, if the faces of the pedestrians are removed by blurring, a machine learning model (e.g., a neural network) will learn to identify blurred objects as faces and will fail to identify pedestrians correctly once presented with unaltered images in the field.

Accordingly, what is needed are methods for collecting and maintaining unaltered video data for training machine learning models, while maintaining the privacy of those video data having personally identifiable information and enabling compliance with data subject rights requests with respect to the video data.

SUMMARY

A method for processing a data rights request is disclosed. The method comprises storing, in a first database, a plurality of data having personally identifiable information of a plurality of persons. The method further comprises receiving, with a processing system, a data rights request from a first person in the plurality of persons, the data rights request indicating a requested action to be performed on first data in the plurality of data having personally identifiable information of the first person. The method further comprises receiving, with the processing system, biometric data of the first person. The method further comprises searching, with the processing system, the first database to identify the first data having personally identifiable information of the first person by matching the biometric data of the first person with the first data in the first database.

A system for processing a data rights request is disclosed. The system comprises a first database configured to store a plurality of data having personally identifiable information of a plurality of persons. The system further comprises a processing system operably connected with the first database. The processing system is configured to receive a data rights request from a first person in the plurality of persons, the data rights request indicating a requested action to be performed on first data in the plurality of data having personally identifiable information of the first person. The processing system is further configured to receive biometric data of the first person. The processing system is further configured to search the first database to identify the first data having personally identifiable information of the first person by matching the biometric data of the first person with the first data in the first database.

BRIEF DESCRIPTION OF THE DRAWINGS

The foregoing aspects and other features of the system and method are explained in the following description, taken in connection with the accompanying drawings.

DETAILED DESCRIPTION

Figure 1:
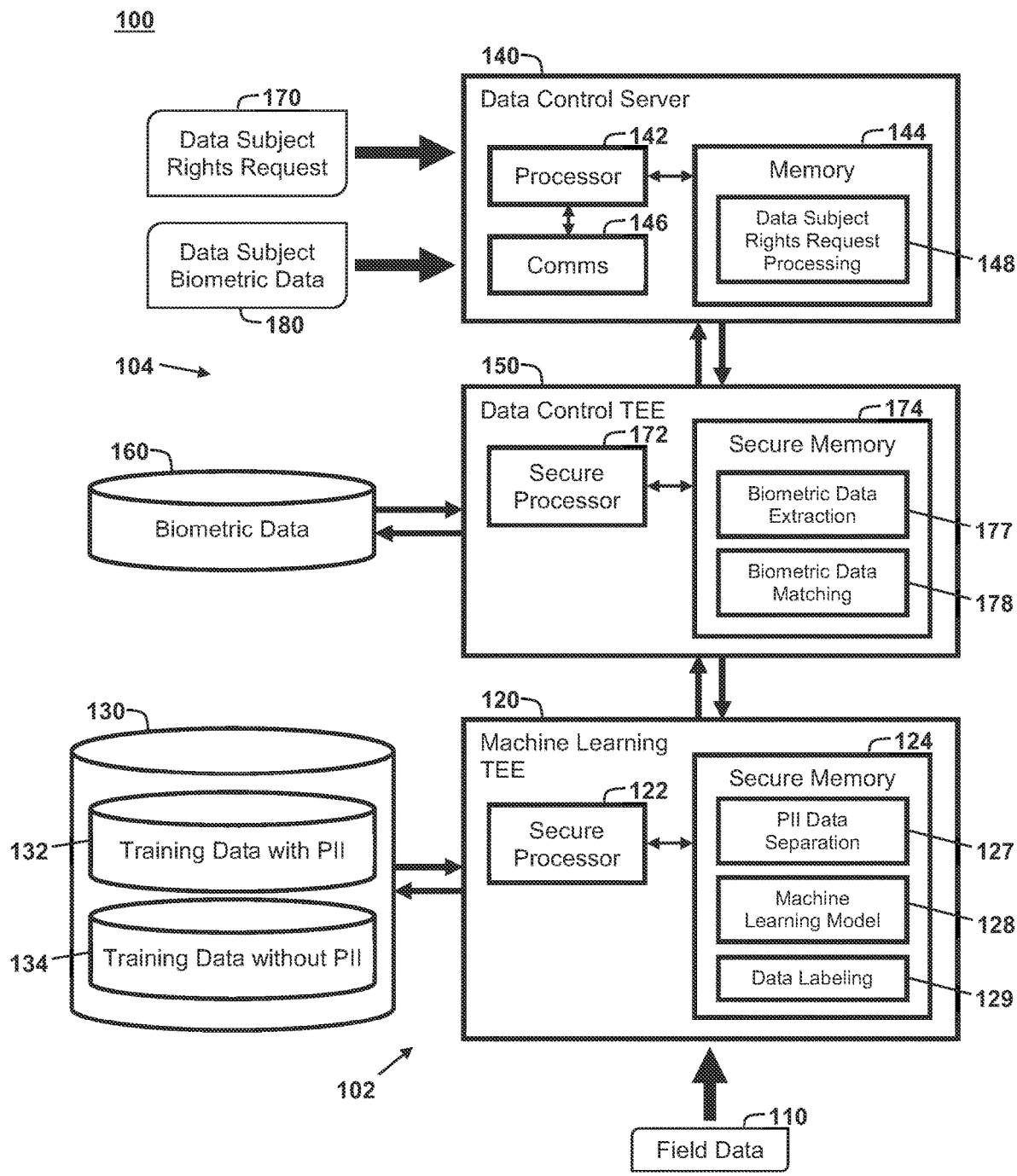
FIG. 1 shows a data processing system for collecting and maintaining data for training machine learning models and for processing data subject rights requests with respect to the data.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

FIG. 1 shows a data processing system 100 for collecting and maintaining data for training machine learning models and for processing data subject rights requests with respect to the data. The data processing system 100 may, for example, be operated by an OEM, supplier, or operator that collects and maintains field data having personally identifiable information (PII). The data processing system 100 advantageously enables data controllers to train machine learning models on unaltered data having PII, while maintaining the privacy of the unaltered data and enabling compliance with data subject rights requests with respect to the data.

As used herein and as will be recognized by those of ordinary skill in the art, the term "personally identifiable information" or "PII" refers to any representation of information that, when used alone or with other relevant data, permits the identity of an individual to whom the information applies to be reasonably inferred by either direct or indirect means. Examples of personally identifiable information that would typically be included in multi-media data include faces and other uniquely identifiable visual features of people in videos or images, voices or other uniquely identifiable audible features of people in audio clips, and certain words or contextual information spoken in videos or audio clips.

The data processing system 100 includes one or more computing devices, such as servers, having one or more trusted execution environments. As will be appreciated by those of ordinary skill in the art, a trusted execution environment (TEE) is an isolated environment for executing code in which trusted applications can be securely executed irrespective of the rest of the system. The TEE is generally an area on a main processor of a device that is separated from the system's main operating system and includes software and hardware configured to ensure that data is stored and processed in a secure manner. Examples of such TEEs include Intel's SGX and ARM's TrustZone.

The data processing system 100 includes at least one component that stores and processes field data 110 having PII, such as video footage that was captured by the autonomous driving systems of a large number of vehicles and which includes the faces of pedestrians in the environment of the vehicles. Particularly, in the illustrated embodiment, the data processing system 100 includes a machine learning system 102 that uses the field data 110 having PII as training data. However, it should be appreciated, however, that the data processing system 100 may include different systems that utilize field data 110 having PII and the machine learning system 102 is just one example of a system that utilizes field data 110 having PII.

In the illustrated embodiment, machine learning system 102 at least comprises (1) at least one machine learning TEE 120 for training at least one machine learning model 128 using the field data 110 and (2) at least one training database 130 that stores the field data 110 as training data. The machine learning model 128 may, for example, comprise an object-detection component of an autonomous driving vision system. The data processing system 100 receives the field data 110 and securely transfers it to the machine learning TEE 120. The machine learning TEE 120 receives the field data 110 and securely stores it in the training database 130. In at least one embodiment, the machine learning TEE 120 separates the field data 110 into a subset of training data with PII 132 and a subset of training data without PII 134. This enables the machine learning system 102 to handle the training data with PII 132 with a higher degree of care from a privacy perspective than the training data without PII 134, for which there are no privacy concerns.

Generally, in order the enable the training of the machine learning model 128, the machine learning system 102 will label the training data 132, 134, often using a process that incorporates human labelers. At least with respect to the training data with PII 132, the machine learning TEE 120 performs the labeling using a process that preserves the privacy of the training data with PII 132. The training data without PII 134 may also be labeled by the machine learning TEE 120, but the labeling of this data can alternatively be outsourced to third-parties, since there are no privacy concerns.

Finally, the machine learning system 102, in particular the machine learning TEE 120, trains the machine learning model 128 using the training data 132, 134. As used herein, the term "machine learning model" refers to a system or set of program instructions and/or data configured to implement an algorithm, process, or mathematical model (e.g., a neural network) that predicts or otherwise provides a desired output based on a given input. It will be appreciated that, in general, many or most parameters of a machine learning model are not explicitly programmed and the machine learning model is not, in the traditional sense, explicitly designed to follow specified rules in order to provide the desired output for a given input. Instead, a machine learning model is provided with a corpus of training data from which it identifies or "learns" patterns and statistical relationships in the data, which are generalized to make predictions or otherwise provide outputs with respect to new data inputs. The result of the training process is embodied in a plurality of learned parameters, kernel weights, and/or filter values that are used in the various components of the machine learning model to make predictions with respect to new data inputs.

The training process generally comprises applying the machine learning model 128 to training input data, comparing the model output with the labeled correct output, and optimizing parameters of the machine learning model 128 based on the comparison. At least with respect to the training data with PII 132, the machine learning TEE 120 performs the training of the machine learning model 128, so as to ensure the privacy of the training data with PII 132.

With continued references to FIG. 1, as a result of storing and processing the field data 110 (i.e., the training data 132, 134), the operator of the data processing system 100 may have certain legal duties under various data protection and data privacy regulations such as those of the European Union's General Data Protection Regulation (GDPR). One of these duties may include responding to and acting upon various data subject rights requests in which a data subject (i.e., a person having personal data stored by the data processing system 100) exercises his or her their right to object to processing, right to access, or right of erasure with respect to the field data 110 stored by the data processing system 100. To these ends, the data processing system 100 further includes a data control system 104 for responding to and acting upon various data subject rights requests.

In the illustrated embodiment, the data control system 104 comprises (1) at least one data control server 140 for receiving and responding to data subject rights requests, (2) at least one data control TEE 150 for securely acting upon data subject rights requests, and (3) at least one biometric database 160 that stores biometric data of data subjects of the training data with PII 132. The data control server 140 receives a data subject rights request 170 in which a data subject exercises one of his or her rights under applicable data protection and data privacy regulations. The data control server 140 processes the data subject rights request 170 and causes the appropriate actions to be performed with respect to the training data with PII 132.

However, in many cases, the training data with PII 132 does not include metadata, such as a name or other identifier, which clearly identifies the particular data subjects of the data, i.e., the particular individuals for whom the training data 132 includes PII. Instead, training data with PII 132 may only include images, audio, and/or video that include PII from which the identity of the data subject can be inferred (e.g., a face, a voice, or similar). To enable the determination of which data in the training data with PII 132 relate to the data subject rights request 170, the data control server 140 further requests and receives data subject biometric data 180 from the particular data subject.

The data subject biometric data 180 is data which can be matched with the data in the training data with PII 132 to identify which data include PII of the particular data subject, and thus takes a similar form to the biometric data in the biometric database 160. In each case, the biometric data may comprise, for example, an image of the data subject's face or an audio voice sample of the data subject, as well as other information such gait information from which a data subject's identity could be inferred. Alternatively, in some embodiments, the biometric data only includes feature sets describing the original biometric data, rather than storing an original face image or audio voice sample.

The data control TEE 150 is configured to operate, in conjunction with the machine learning TEE 120 of the machine learning system 102, to determine which data in the training data with PII 132 relate to the data subject rights request 170, based on the data subject biometric data 180. To enable this determination, the data control TEE 150 extracts biometric data from the training data with PII 132 and stores the extracted biometric data in the biometric data base 160. The data control TEE 150 matches the received data subject biometric data 180 with biometric data stored in the biometric data base 160. Based on the matching, the data control TEE 150 communicates with the machine learning TEE 120 to cause the machine learning TEE 120 to perform the request action with respect to the data in the training data with PII 132 corresponds to the matched biometric data in the biometric database. The performed actions may include, for example, erasing the corresponding data, providing access to the corresponding data, and marking the data as "do not process".

With continued reference to FIG. 1, exemplary hardware components of the computing and storage devices of the data processing system 100 are described. In the illustrated embodiment, the data control server 140 includes, a processor 142, a memory 144, and a network communications module 146. It will be appreciated that the illustrated embodiment of the data control server 140 is only one exemplary embodiment of a server 100 and is merely representative of any of various manners or configurations of a personal computer, server, or any other data processing systems that are operative in the manner set forth herein.

The processor 142 is configured to execute instructions to operate data control server 140 to enable the features, functionality, characteristics and/or the like as described herein. To this end, the processor 142 is operably connected to the memory 144 and the network communications module 146. The processor 142 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 142 may include a system with a central processing unit, graphics processing units, multiple processing units, dedicated circuitry for achieving functionality, programmable logic, or other processing systems.

The memory 144 is configured to store program instructions that, when executed by the processor 142, enable the data control server 140 to perform various operations described herein. Particularly, the memory 144 stores programs instructions corresponding to a data subject rights request processing application 148 for processing the data subject rights request(s) 170. The memory 144 may be of any type of device or combination of devices capable of storing information accessible by the processor 142, such as memory cards, ROM, RAM, hard drives, discs, flash memory, or any of various other computer-readable media recognized by those of ordinary skill in the art.

The network communications module 146 provides an interface that allows for communication with any of various devices. In particular, the network communications module 146 may include a local area network port that allows for communication with any of various local computers housed in the same or nearby facility. Generally, the data control server 140 communicates with remote computers over the Internet via a separate modem and/or router of the local area network. Alternatively, the network communications module 146 may further include a wide area network port that allows for communications over the Internet. In one embodiment, the network communications module 146 is equipped with a Wi-Fi transceiver or other wireless communications device. Accordingly, it will be appreciated that communications with the servers 100 may occur via wired communications or via the wireless communications and may be accomplished using any of various known communications protocols.

The training database 130 and the biometric database 160 comprise data storage devices configured to store data. The data storage devices may be of any type of long-term non-volatile storage device capable of storing information accessible by the machine learning TEE 120 and/or the data control TEE 150, such as hard drives or any of various other computer-readable storage media recognized by those of ordinary skill in the art. The data storage devices preferably store the data thereof in an encrypted form that renders the data only accessible by the machine learning TEE 120 and/or the data control TEE 150 (e.g., using secret keys generated and known only within the TEEs).

In the illustrated embodiment, the machine learning TEE 120 and the data control TEE 150 include respective secure processors 122, 172 and respective secure memories 124, 174. However, it should be appreciated that, depending on how the TEEs are implemented, their components may be subcomponents of corresponding hardware of a host computing device. For example, the data control TEE 150 may be implemented by TEE-enabled hardware of the data control server 140 (e.g., by the processor 142). Likewise, the machine learning TEE 120 may be implemented by TEE-enabled hardware of a machine learning server (not shown). Moreover, in some embodiments, the machine learning TEE 120 and the data control TEE 150 may be the same TEE implemented by the same host computing device. Alternatively, the TEEs can be implemented with physically distinct hardware that is physically isolated from that of the host computing device.

In at least some embodiments, the secure memories 124, 174 are private secure enclaves corresponding to a defined portion of a physical memory of a host computing device (e.g., a machine learning server and/or the data control server 140), which is encrypted by security instructions of the processor of the host computing device. The secure memories 124, 174 are configured to store program instructions that, when executed by the secure processors 122, 172, enable the data control server 140 to perform various operations described herein. Particularly, the secure memory 124 stores programs instructions for trusted applications including (1) the machine learning model 128, (2) a PII data separation application 127 for separating the field data into the training data with PII 132 and the training data without PII 134, and (3) a data labeling application 129 for labeling the training data 132, 134. Additionally, the secure memory 174 stores programs instructions for trusted applications including (1) a biometric data extraction application 177 for extracting biometric data from the training data with PII 132 and (2) a biometric data matching application 178 for matching the data subject biometric data 180 with the biometric data in the biometric database 160. Finally, in at least some embodiments, the secure processors 122, 172, are simply trusted processes that are executed on the physical processor of the host computing device in a secure manner.

Methods for Processing a Data Subject Rights Request

A variety of methods and processes are described below for operating the data processing system 100. In these descriptions, statements that a method, processor, and/or system is performing some task or function refers to a controller or processor (e.g., the processor 142 of the data control server 140 or the secure processors 122, 172 of the TEEs 120, 150) executing programmed instructions stored in non-transitory computer readable storage media (e.g., the memory 144 of the data control server 140 or the secure memories 124, 174 of the TEEs 120, 150) operatively connected to the controller or processor to manipulate data or to operate one or more components in the data processing system 100 to perform the task or function. Additionally, the steps of the methods may be performed in any feasible chronological order, regardless of the order shown in the figures or the order in which the steps are described.

Figure 2:
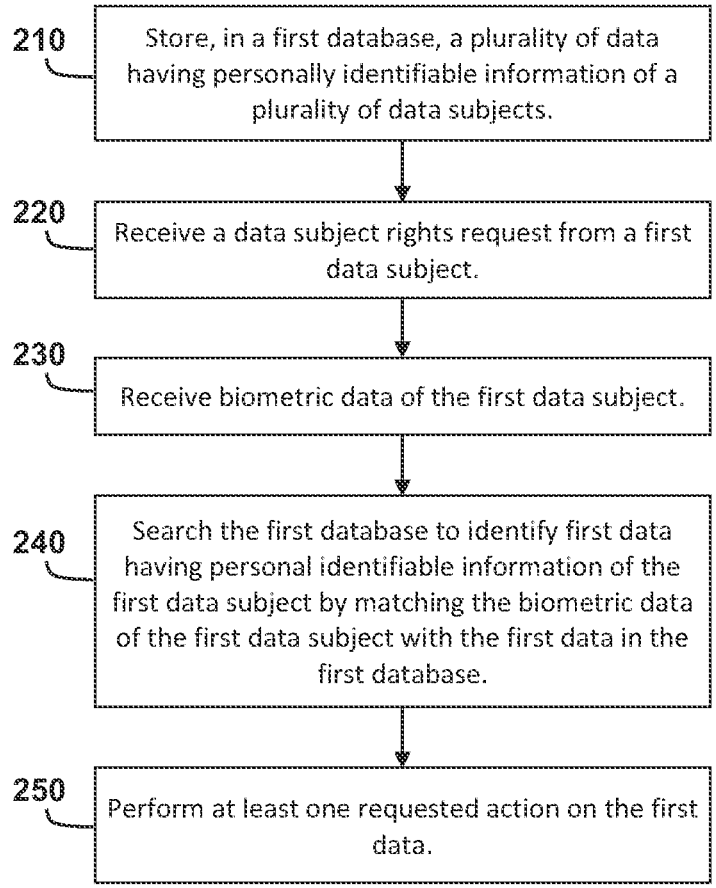
FIG. 2 shows a method for processing a data subject rights request.

FIG. 2 shows a method 200 for processing a data subject rights request. The method 200 advantageously enables compliance with data subject rights requests with respect to data that does not include any metadata or similar indications that clearly identify the particular data subjects of the data. Particularly, the method 200 advantageously leverages biometric data provided by the data subject to identify particular data that includes PII of the data subject.

The method 200 begins with storing, in a first database, a plurality of data having personally identifiable information of a plurality of data subjects (block 210). Particularly, the data processing system 100 receives field data 110 from a plurality of remote computing devices. In at least one embodiment, the plurality of remote computing devices comprise vehicle computers of a plurality of vehicles and the field data 110 comprises video data captured by the plurality of vehicles, for example by an object detection system of the vehicle. The data processing system 100, in particular the machine learning TEE 120, stores the field data 110 in the training database 130 as training data. In one embodiment, the machine learning TEE 120 receives the field data 110 in an encrypted form from the plurality of remote computing devices and unencrypts the field data 110 within the machine learning TEE 120 before storing it in the training database 130. As discussed above, the training data includes training data with PII 132 and training data without PII 134. In at least one embodiment, the machine learning TEE 120 separates the field data 110 into a subset of training data with PII 132 and a subset of training data without PII 134.

Additionally, the data processing system 100 stores a plurality of biometric data in the biometric database 160, which is extracted training data with PII 132 and maintained by the data control system 104, in particular by the data control TEE 150. To this end, as new data is added to the training data with PII 132 in the training database 130, the data control TEE 150 receives the new training data with PII 132 or at least the portion thereof containing the PII. In one embodiment, data control TEE 150 receives the new training data with PII 132 in an encrypted form from the machine learning TEE 120 and unencrypts the new training data with PII 132 within the data control TEE 150 before extracting the biometric data therefrom.

For each the new training data with PII 132, the data control TEE 150 extracts respective biometric data therefrom (e.g., using the biometric data extraction application 177) and stores the respective biometric data in the biometric database 160. In alternative embodiments, the machine learning TEE 120 instead extracts the biometric data and provides it to the data control TEE 150 for storage in the biometric database 160. In embodiments in which the biometric data includes facial images extracted from image or video data, the biometric data extraction application 177 may include, for example, a facial recognition algorithm. In at least one embodiment, the data control TEE 150 keeps a record of which biometric data was extracted from which training data with PII 132. Such a record may be stored in the biometric database 160, for example as metadata of the individual pieces of extracted biometric data.

The method 200 continues with receiving a data subject rights request from a first data subject (block 220). Particularly, the data processing system 100, or more particularly the processor 142, receives the data subject rights request 170 of a respective data subject (i.e., a person), via the network communications module 146. In some embodiments, the data subject rights request 170 takes the form of a message received from some third-party device or system via the Internet. In other embodiments, the data processing system 100 may implement a web-based interface that enables data subjects to make data subject rights requests and provide the necessary information directly using the web-based interface.

The data subject rights request 170 at least identifies a requested action to be performed on data having personally identifiable information of the data subject. As discussed above, these requested actions may include, for example, erasing the corresponding data, providing access to the corresponding data, and marking the data as "do not process". In at least some embodiments, data subject rights request 170 further includes at least one parameter that delimits a scope of the data that is subject to the requested action. The parameter may include a time or a place at which the data was originally captured or specify a particular data type. For example, the data subject rights request 170 might ask for the deletion of all images taken of the data subject on a specific time or place (e.g. "delete all images of me at Stuttgart that were collected between Jan. 1, 2021 and Mar. 31, 2021").

In some embodiments, the data control server 140 adopts an identity verification measure such that only data subject rights request 170 from a verified data subject is acted upon. This identity verification measure protects the data controller from a malicious data subject rights request intended to sabotage the data controller's service by removing arbitrary data Likewise, this identity verification measure protects the data subject from a malicious data subject rights request from a third-party that wants to use the data for nefarious purposes.

Particularly, in one embodiment, the processor 142 further uses a certificate or similar cryptographic data that verifies an identity of the data subject. The processor 142 receives the certificate or similar cryptographic data from a trusted identity provider, such as Apple's infrastructure or some governmental identity infrastructure, to verify the identity of the data subject. Such certificates can be stored in (tamper-resistant) devices or (in the case of no tampered proof devise available) the certificate can be retrieved from trusted identity provider in privacy preserving manner. In such embodiments, in response to receiving the data subject rights request 170 and/or the data subject biometric data 180, the processor 142 may operate the network communications module 146 to request the certificate from the trusted identity provider and then the processor 142 validates the certificate to verify an identity of the data subject.

Alternatively, in another embodiment, an adapted zero-knowledge based interactive protocol is utilized to issue the data subject rights request 170 without revealing the certificate (the proof of the request). This advantageously provides plausible deniability when the machine learning system 102 and the data control system 104 do not collude.

The method 200 continues with receiving biometric data of the first data subject (block 230). Particularly, the data processing system 100, or more particularly the processor 142, receives the data subject biometric data 180 of the respective data subject, via the network communications module 146. The data subject biometric data 180 may be included with the data subject rights request 170 or received separately therefrom. As noted above, the data subject biometric data 180 is data, such as an image of the data subject's face, which can be matched with the data in the training data with PII 132 to identify which data include PII of the particular data subject.

In at least one embodiment, the processor 142 receives the data subject biometric data 180 in an encrypted form. The processor 142 transfers the encrypted data subject biometric data 180 to the data control TEE 150. The data control TEE 150 receives the encrypted data subject biometric data 180 from the processor 142, stores encrypted data subject biometric data 180 in the secure memory 174, and unencrypts the encrypted data subject biometric data 180 within the secure memory 174 using secure processes of the data control TEE 150.

The method 200 continues with searching the first database to identify first data having personal identifiable information of the first data subject by matching the biometric data of the first data subject with the first data in the first database (block 240). Particularly, the data processing system 100, searches the training database 130 to identify a set of data from the training database 130 having PII of the data subject. In at least some embodiments, the training database 130 is searched indirectly by searching the biometric database 160 for biometric data that matches the data subject biometric data 180 and then identifying the original source data in the training database 130 from which the matching biometric data was extracted.

In at least one embodiment, the data processing system 100 only performs the search in response to verifying the identity of the data subject using the identity verification measure discussed above. In at least one embodiment, the data processing system 100 searches the training database 130 depending on at least one parameter included in the data subject rights request 170 that delimits the scope of the data that is subject to the requested action (e.g., a time, place, or data type).

In the particular embodiments described herein, the data control TEE 150 searches the biometric database 160 by matching the data subject biometric data 180 of the data subject with matching biometric data in the biometric database 160 that corresponds to the data subject. Next, the data control TEE 150 identifies the set of data in the training database 130 (in particular, in the training data with PII 132) from which the matching biometric data in the biometric database 160 were extracted. As noted above, the data control TEE 150 may keep records or metadata identifying which biometric data was extracted from which training data with PII 132. Accordingly, the data control TEE 150 identifies the set of data from the training data with PII 132 in the training database 130 based on the records or metadata, which indicate the particular training data with PII 132 from which the matching biometric data were extracted.

The method 200 continues with performing at least one requested action on the first data (block 250). Particularly, once the set of data from the training database 130 having PII of the particular data subject is identified, processing system 100 performs the requested action(s) of the data subject rights request 170 with respect to the identified set of data from the training database 130 having PII of the data subject. More particularly, in some embodiments, the data control TEE 150 communicates with the machine learning TEE 120 to cause the machine learning TEE 120 to perform the request action with respect to the identified the set of data in the training database 130. For example, in one embodiment, the data control TEE 150 communicates, in an encrypted manner to the machine learning TEE 120, the records or metadata identifying the original set of data in the training database 130 having PII of the data subject. Next, the machine learning TEE 120 performs the requested action(s) on the set of data in the training database 130 having PII of the data subject.

The performed actions may include, for example, erasing the data, providing access to the data, and marking the data as "do not process". Particularly, in the case that the requested action is to erase the data, the processing system 100 and/or the machine learning TEE 120 deletes the set of data having PII of the data subject from the training database 130. In the case that the requested action is to provide access to the data, the processing system 100 and/or the machine learning TEE 120 provides access to the set of data having PII of the data subject. Access may, for example, be provided by encrypting the data and transmitting the encrypted data to a computing device of the data subject.

In the case that the requested action is to mark the data as "do not process", the processing system 100 and/or the machine learning TEE 120 flags the set of data having PII of the data subject in the database 130 such that further processing of the data is prevented, or moves the set of data having PII of the data subject to another database for such flagged data. From that point forward, during training of the machine learning model 128, the training process excludes any training data that is flagged so as to prevent further processing.

Additionally, as new field data 110 is received by the processing system 100, the machine learning TEE 120 or another component of the data processing system 100 automatically checks the new field data 110 against previously flagged data or corresponding data subject biometric data 180 of a previous "do not process" request. If the new field data 110 includes PII of the data subject, the machine learning TEE 120 or another component of the data processing system 100 automatically flags the new field data 110 so as to prevent further processing, in the same manner as above Likewise, the if the data subject previously requested erasure of their data, then the machine learning TEE 120 or another component of the data processing system 100 automatically deletes the new field data 110. In some embodiments, rather than deleting or flagging the data having PII of the data subject, the processing system 100 is instead configured to replace the set of data having PII of the data subject with synthetically generated substitute data or blur/mask the PII of the of the data subject.

In this way, data subjects not only can opt-out of processing of data already stored in the training database 130, but can also opt-out of processing of new data that is received in the future. Alternatively, if the privacy regulations are tighter, an opt-in system can be implemented. In some embodiments, data subjects are further given a choice of deniability of their requests to make it impossible to later see that the requests that have been made.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for processing a data rights request, the method comprising:
   storing, in a first database, a plurality of data having personally identifiable information of a plurality of persons including a plurality of biometric data of the plurality of persons;
   extracting, with the processing system, the plurality of biometric data of the plurality of persons from the plurality of data in the first database, the plurality of biometric data including first biometric data of a first person;
   storing, in a second database, a copy of the plurality of biometric data that has been extracted from the plurality of data in the first database;
   receiving, with a processing system, a data rights request from the first person in the plurality of persons, the data rights request indicating a requested action to be performed on first data in the plurality of data having personally identifiable information of the first person;
   receiving, with the processing system, second biometric data of the first person; and
   searching, with the processing system, after receiving the data rights request and the second biometric data, the first database to identify the first data having personally identifiable information of the first person by matching the second biometric data of the first person with the first data in the first database, the searching including (i) matching the second biometric data of the first person to the first biometric data of the first person in the plurality of biometric data in the second database, and (ii) identifying the first data in the plurality of data of the first database from which the matched first biometric data was extracted.

2. The method according to claim 1 further comprising:
   performing, with the processing system, the requested action on the first data in the first database.

3. The method according to claim 2, the performing the requested action further comprising:
   deleting the first data from the first database.

4. The method according to claim 2, the performing the requested action further comprising:
   providing access to the first data to the first person.

5. The method according to claim 2, the performing the requested action further comprising:
   flagging the first data in the first database such that further processing of the first data is prevented.

6. The method according to claim 5 further comprising:
   training, with the processing system, a machine learning model using the plurality of data in the first database, excluding any data in the first database that has been flagged.

7. The method according to claim 5 further comprising:
   receiving, with the processing system, additional data having personally identifiable information; and
   flagging, with the processing system, the additional data in response to the additional data having personally identifiable information of the first person, such that further processing of the additional data is prevented.

8. The method according to claim 1, wherein the second biometric data of the first person is a second image of a face of the first person and the first biometric data of the first person in the first data in the first database includes a first image or a first video of the face of the first person.

9. The method according to claim 1 further comprising:
   receiving, with the processing system, a certificate that verifies an identity of the first person,
   wherein the searching the first database to identify the first data is performed in response to receiving the certificate.

10. The method according to claim 1 further comprising:
    receiving, with the processing system, the plurality of data having personally identifiable information from a plurality of remote computing devices.

11. The method according to claim 10, the receiving the plurality of data further comprising:
    receiving the plurality of data from vehicle computers of a plurality of vehicles,
    wherein the plurality of data include video data captured by the plurality of vehicles.

12. The method according to claim 10 further comprising:
    separating, with the processing system, the plurality of data into (i) a first subset of the plurality of data having personally identifiable information and (ii) a second subset of the plurality of data without any personally identifiable information.

13. The method according to claim 1, the receiving the second biometric data of the first person further comprising:
   receiving encrypted second biometric data of the first person;
   transferring the encrypted second biometric data of the first person to at least one trusted execution environment; and
   unencrypting the encrypted second biometric data of the first person using the at least one trusted execution environment.

14. The method according to claim 1, the extracting further comprising:
   receiving, in at least one trusted execution environment, respective encrypted data of the plurality of data in the first database;
   unencrypting the respective encrypted data using the at least one trusted execution environment; and
   extracting biometric data of the plurality of biometric data from the unencrypted data using the at least one trusted execution environment.

15. The method according to claim 1, wherein the data rights request includes at least one parameter that delimits a scope of the first data, the searching further comprising:
   searching the database to identify the first data based on the at least one parameter.

16. The method according to claim 15, wherein the at least one parameter is at least one of a time and a place at which the first data was originally captured.

17. The method according to claim 1, the searching further comprising:
   searching the first database using at least one trusted execution environment.

18. A system for processing a data rights request, the system comprising:
   a first database configured to store a plurality of data having personally identifiable information of a plurality of persons including a plurality of biometric data of the plurality of persons;
   a second database configured to store a copy of the plurality of biometric data that has been extracted from the plurality of data in the first database, the plurality of biometric data including first biometric data of a first person; and
   a processing system operably connected with the first database, the processing system being configured to:
      receive a data rights request from the first person in the plurality of persons, the data rights request indicating a requested action to be performed on first data in the plurality of data having personally identifiable information of the first person;
      receive second biometric data of the first person; and
      search, after receiving the data rights request and the second biometric data, the first database to identify the first data having personally identifiable information of the first person by matching the second biometric data of the first person with the first data in the first database, the searching including (i) matching the second biometric data of the first person to the first biometric data of the first person in the plurality of biometric data in the second database, and (ii) identifying the first data in the plurality of data of the first database from which the matched first biometric data was extracted.

* * * * *